(12) United States Patent
Taormina

(10) Patent No.: US 10,354,128 B2
(45) Date of Patent: Jul. 16, 2019

(54) APPARATUS AND METHOD FOR IMPROVING SWIMMER PERFORMANCE

(71) Applicant: Friendsport, Inc., Fort Myers, FL (US)

(72) Inventor: Sheila Taormina, Fort Myers, FL (US)

(73) Assignee: FRIENDSPORT, INC., Fort Myers, FL (US)

( * ) Notice: Subject to any disclaimer, the term of this patent is extended or adjusted under 35 U.S.C. 154(b) by 13 days.

(21) Appl. No.: 15/835,205

(22) Filed: Dec. 7, 2017

(65) Prior Publication Data

US 2019/0180091 A1    Jun. 13, 2019

(51) Int. Cl.

| G06K 9/00 | (2006.01) |
| G06T 7/292 | (2017.01) |
| G06K 9/32 | (2006.01) |
| A63B 69/12 | (2006.01) |
| G06T 7/149 | (2017.01) |

(52) U.S. Cl.
CPC .......... *G06K 9/00342* (2013.01); *A63B 69/12* (2013.01); *G06K 9/32* (2013.01); *G06T 7/149* (2017.01); *G06T 7/292* (2017.01); *G06K 2209/40* (2013.01); *G06T 2207/30196* (2013.01)

(58) Field of Classification Search
CPC ....... G06K 9/00342; G06K 9/32; A63B 69/12
See application file for complete search history.

(56) References Cited

U.S. PATENT DOCUMENTS

| 4,135,498 A * | 1/1979 | McGee ..................... G01B 3/00 33/512 |
| 6,215,898 B1 * | 4/2001 | Woodfill .................. G06K 9/32 382/154 |
| 9,350,951 B1 * | 5/2016 | Rowe ................... H04N 5/2621 |
| 2004/0218786 A1 * | 11/2004 | Murakoshi ......... A63B 24/0003 382/107 |
| 2006/0281060 A1 * | 12/2006 | Katayama .......... A63B 24/0003 434/247 |
| 2013/0123034 A1 * | 5/2013 | Pohl .................... G09B 19/0038 473/220 |
| 2013/0225309 A1 * | 8/2013 | Bentley .................. A63B 69/36 473/266 |
| 2013/0278779 A1 * | 10/2013 | Hong ..................... H04N 7/144 348/187 |
| 2014/0219570 A1 * | 8/2014 | Hanish ............... G06K 9/00342 382/201 |

(Continued)

*Primary Examiner* — Robert J Hance
(74) *Attorney, Agent, or Firm* — Viksnins Harris Padys Malen LLP

(57) ABSTRACT

The present disclosure describes some embodiments of an apparatus including a measurement panel to enable generation of a measurement related to one or more data points associated with a swimmer's stroke. The disclosure also describes an embodiment of a method including processing one or more images associated with a plurality of model swimmers to obtain information related to at least two structural data points related to a swimming stroke having a catch phase, processing one or more images associated with a target swimmer to obtain information related to the at least two structural data points associated with a target swimmer's catch phase, and generating one or more recommendations to change the catch phase of the target swimmer to bring the catch phase of the target swimmer closer to the model swimmer's catch phase.

3 Claims, 13 Drawing Sheets

(56) References Cited

U.S. PATENT DOCUMENTS

| | | | |
|---|---|---|---|
| 2014/0330410 A1* | 11/2014 | Lochmann | G01S 19/19 |
| | | | 700/91 |
| 2015/0072797 A1* | 3/2015 | Sakyo | A63B 24/0006 |
| | | | 473/223 |
| 2015/0139502 A1* | 5/2015 | Holohan | G06K 9/00342 |
| | | | 382/107 |
| 2017/0043212 A1* | 2/2017 | Wong | A61B 5/1114 |
| 2017/0182360 A1* | 6/2017 | Chang | G06F 7/02 |
| 2018/0357472 A1* | 12/2018 | Dreessen | G06N 20/00 |

* cited by examiner

APPARATUS AND METHOD FOR IMPROVING SWIMMER PERFORMANCE

BACKGROUND

Improving a swimmer's performance, propulsion speed, is a complex process dependent on the science of physics and fluid dynamics and changes to the swimmer's stroke on the order of two or three centimeters. Translation of the science of swimming to effective, practical guidance for solving the problem of improving a swimmer's performance at the Olympic or world record holder level is substantially non-existent. There are no standards that identify the optimum ranges for parameters that define the complex motions of elite swimmers. Even identifying deficiencies in a particular swimmer's mechanics at the centimeter scale is difficult. Providing guidance that enables a swimmer to make the correct mechanical change at this scale has proved elusive. Historically, coaches have provided vague, abstract verbal cues to direct a swimmer to change her stroke. Unfortunately, the swimmer often is unable to translate those cues into mechanical movements that improve performance. For these and other reasons there is a need for the subject matter of the present disclosure.

SUMMARY

In some embodiments an apparatus includes a measurement panel to enable generation of a measurement related to one or more data points associated with a swimmer's stroke, wherein the measurement panel includes a measurement grid to provide a standard for measuring the one or more data points associated with the swimmer's stroke.

DESCRIPTION

Figure 1A:
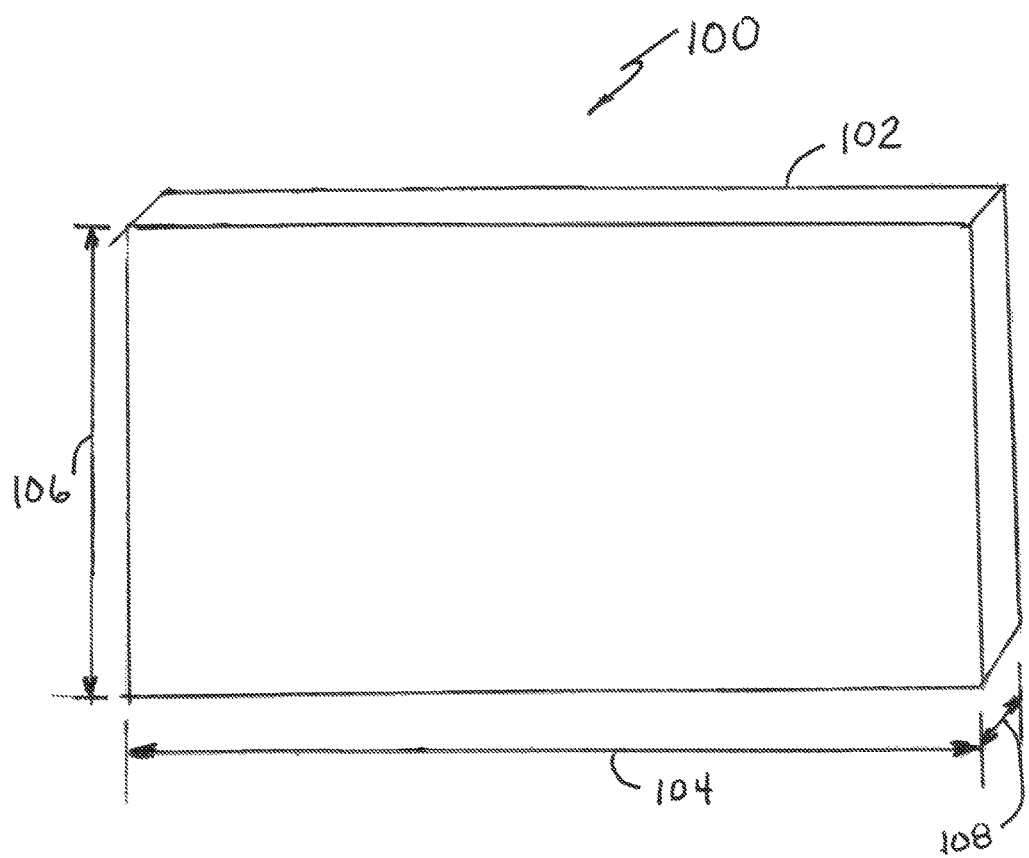
FIG. 1(a) shows an illustration of a perspective view of an apparatus including a measurement panel to enable generation of a measurement related to one or more data points associated with a swimmer's stroke in accordance with some embodiments of the preset disclosure.

FIG. 1(a) shows an illustration of a perspective view of an apparatus 100 including a measurement panel 102 to enable generation of a measurement related to one or more data points associated with a swimmer's stroke in accordance with some embodiments of the present disclosure. The dimensions of length 104 and width 106 of the measurement panel 102 are selected to enable imaging of at least one complete cycle of a swimmer's stroke. A thickness 108 dimension is selected so that the measurement panel 102 is relatively light for ease of transportation and positioning in a swimming pool. Thus, in some embodiments, the measurement panel 102 has a length 104 of between about seven feet and about nine feet, a width 106 of between about two-and-one-half feet and about four feet, and a thickness 108 of between about one-tenth of an inch and about three-tenths of an inch. In some embodiments, the thickness 108 is about 0.135 inches.

Figure 1B:
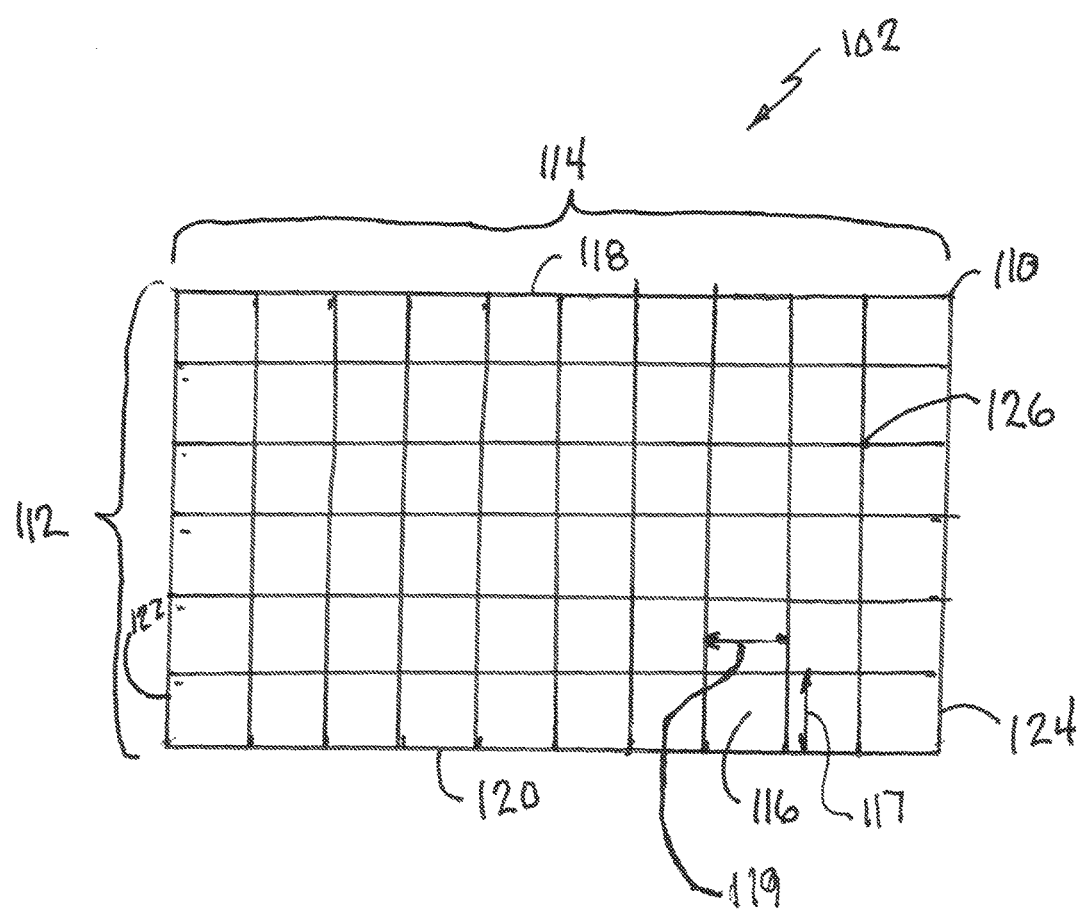
FIG. 1(b) shows an illustration of a front view of the measurement panel shown in FIG. 1(a) in accordance with some embodiments of the present disclosure.

FIG. 1(b) shows an illustration of a front view of the measurement panel 102 shown in FIG. 1(a) in accordance with some embodiments of the present disclosure. The measurement panel 102 includes a measurement grid 110 to provide a standard for measuring the one or more data points associated with a swimmer's stroke. The measurement grid 110 includes a network of horizontal members 112 and vertical members 114 that cross each other to form a series of holes, such as hole 116, having a substantially square or rectangular shape defined by the vertical members 114 and the horizontal members 112. In some embodiments, the series of holes included in the measurement grid 110 includes an array of holes, each hole in the array of holes having an area of about 2.25 square inches. For the measurement grid 110 the array, an ordered arrangement of holes, includes a series of substantially parallel horizontal rows of holes and a series of substantially parallel vertical columns of holes. In some embodiments, each hole, such as the hole 116, in the array of holes is substantially square having a length of about 1.5 inches and a width of about 1.5 inches. In some embodiments, the hole 116 has a hole length 117 of between about one inch and about two inches and a hole width 119 of between about one inch and about two inches. In some embodiments, the hole length 117 is substantially equal to the hole width 119.

The horizontal members 112 and the vertical members 114 are not limited to being formed from a particular material. In some embodiments, the horizontal members 112 and the vertical members 114 are formed from stainless steel, such as stainless steel wire. In some embodiments, the horizontal members 112 and the vertical members 114 are formed from a non-metal. When formed from metal wire, the horizontal members 112 and the vertical members 114 have a diameter of between about one-tenth of an inch and about three-tenths of an inch. In some embodiments, the horizontal members 112 and the vertical members 114 have a diameter of about 0.135 inches. The measurement grid 110 also includes a top horizontal edge 118, a bottom horizontal edge 120, a first vertical edge 122 and a second vertical edge 124.

In some embodiments, in forming the measurement grid 110, the horizontal members 112 are interwoven with the vertical members 114 to form intersections of the horizontal members 112 and the vertical members 114, such as intersection 126. Interweaving the horizontal members 112 and the vertical members 114 increases the strength of the measurement grid 110. In some embodiments, each of the intersections, such as an intersection 126, is welded to provide additional structural strength to the measurement grid 110.

The horizontal members 112 and the vertical members 114 of the measurement grid 110 may be coated or uncoated. A coating may provide better resolution of the horizontal members 112 and the vertical members 114 when imaged and used to measure data points of a swimmer's stroke. A coating may also prevent corrosion in a chemically reactive environment, such as a swimming pool. One exemplary coating, suitable for use in connection with the fabrication of the horizontal members 112 and the vertical members 114, is powder black. A powder coating creates a hard finish that is substantially unreactive with the chemicals associated with a swimming pool environment. The word "black" in "powder black" denotes a dark color resulting from the substantially complete absorption of light. Any coating that increases the contrast between the measurement, measurement grid 110 and an imaged swimmer is suitable for use in connection with the fabrication of the measurement grid 110.

FIG. 1(c) shows an illustration of a perspective view of an apparatus 128 including the measurement panel 102 shown in FIG. 1(a) and a first stabilizing structure 130 coupled to the measurement panel 100 and a second stabilizing structure 132 coupled to the measurement panel 100 in accordance with some embodiments of the present disclosure. The first stabilizing structure 130 and the second stabilizing structure 132 provide stabilization of the measurement panel 100 when deployed in a swimming pool. Stabilization is provided by coupling the first stabilization structure 130 to the first vertical edge 122 (shown in FIG. 1(b)) of the measurement panel 100 at an angle of about ninety degrees and the second stabilization structure 132 to the second vertical edge 124 (shown in FIG. 1(b)) of the measurement panel 102 at an angle of about ninety degrees. Coupling may be provided by fasteners, such as screw-and-bolt fasteners. Thus, the measurement panel 102 without tipping can be aligned substantially parallel to the path of a swimmer to capture a side view of the swimmer's stroke overlaid on the measurement grid 110 or substantially perpendicular to the path of a swimmer to capture a front view of the swimmer's stroke through the measurement grid 110.

The first stabilizing structure 130 and the second stabilizing structure 132 are designed to provide a low resistance when being moved through the water of a swimming pool. One exemplary design suitable for use in connection with the fabrication of the first stabilization structure 130 and the second stabilization structure 132 is substantially similar to the design of the measurement grid 110 shown in FIG. 1(b). Horizontal and vertical members are arranged to provide a grid of holes in the first stabilizing structure 130 and the second stabilizing structure 132. Since images the first stabilizing structure 130 and the second stabilizing structure 132 are not being combined with images of a swimmer, restrictions on the size of the holes and the selection of contrast coatings are less important. When coupled to the measurement panel 102 in the apparatus 128, the first stabilizing structure 130 and the second stabilizing structure 132 enable ease of movement and positioning of the apparatus 128 including the measurement panel 102 when the apparatus 128 submerged in a swimming pool.

Figure 1:
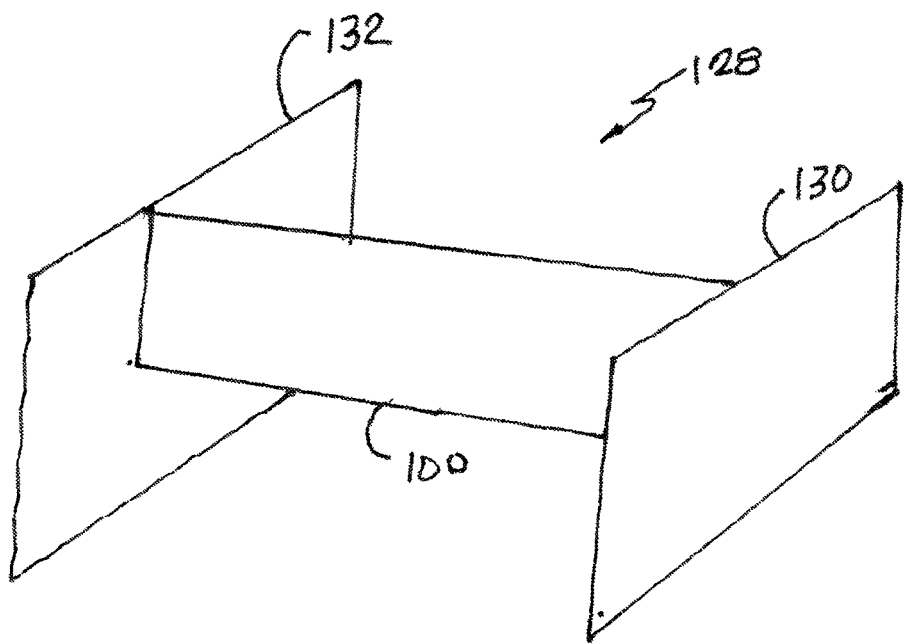
FIG. 1(c) shows an illustration a perspective view of an apparatus including the measurement panel shown in FIG. 1(a) and a first stabilizing structure coupled to the measurement panel and a second stabilizing structure coupled to the measurement panel in accordance with some embodiments of the present disclosure.
FIG. 1(d) shows an illustration of a side view of the first stabilizing structure, shown in FIG. 1(c), and an adjustable tee structure in accordance with some embodiments of the present disclosure.
FIG. 1(e) shows an illustration of a front view of the measurement panel, shown in FIG. 1(a), positioned in a swimming pool having a surface and positioned at least partially below the surface of the water and substantially parallel to the surface of the water in accordance with some embodiments of the present disclosure.
FIG. 1(f) shows an illustration of a top view of a swimmer's path in a swimming pool in relation to the measurement panel shown in FIG. 1(a) and a first camera aligned substantially perpendicular to the measurement panel and a second camera aligned substantially perpendicular to the measurement panel in accordance with some embodiments of the present disclosure.
Figure 1D:
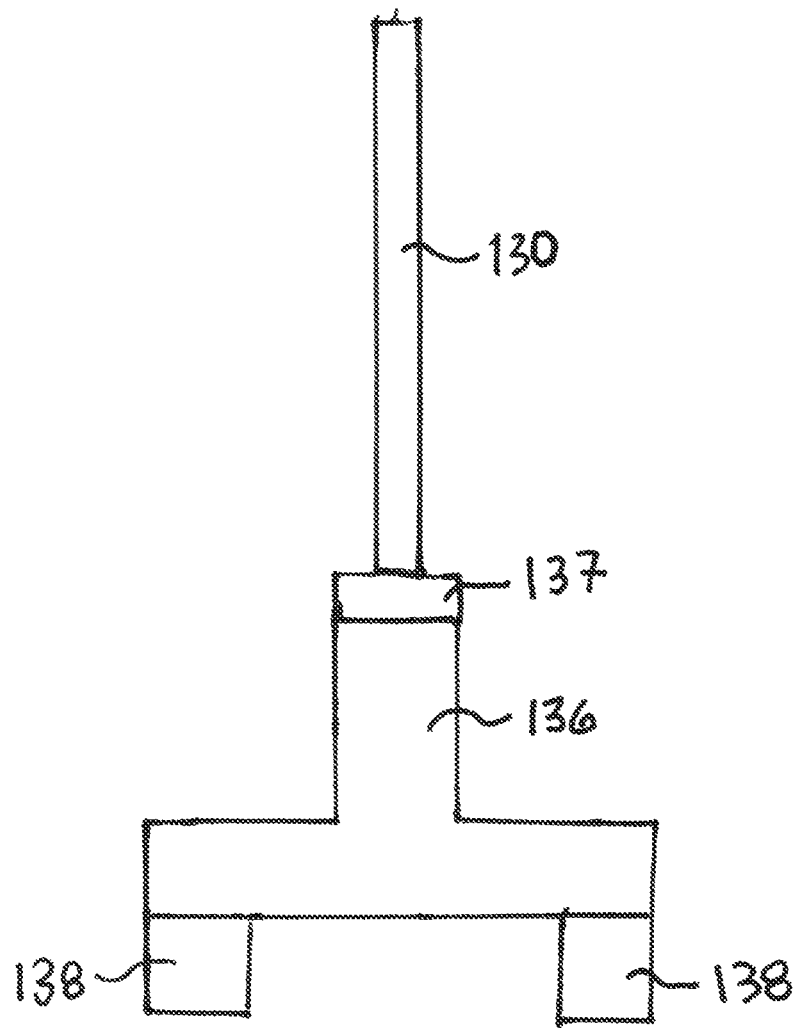

FIG. 1(d) shows an illustration of a side view of the first stabilizing structure 130 (shown in FIG. 1(c)) and an adjustable tee structure 136 in accordance with some embodiments of the present disclosure. The adjustable tee structure 136 is coupled to the first stabilizing structure 130 by a fastener 137. An exemplary fastener suitable for use in connection with coupling the first adjustable tee structure 136 to the first stabilizing structure 130 is a screw and bolt fastener.

Those skilled in the art will appreciate that in operation the first stabilizing structure 130 is stabilized by securing an instance of the adjustable tee structure 136 to each end of the first stabilizing structure 130. Similarly, those skilled I the art will appreciate that in operation the second stabilizing structure 132 is stabilized by securing an instance of the adjustable tee structure 136 to each end of the second stabilizing structure 132.

The first adjustable tee structure 136 includes a height and level adjuster 138. Mechanisms suitable for use in connection with the height and level adjuster 138 include adjustable screw mechanisms and adjustable ratchet mechanisms. In operation, the height and level adjuster 138 is adjusted to substantially align the top horizontal edge 118 (shown in FIG. 1(c)) of the apparatus 128 (shown in FIG. 1(c)) to the water surface when the apparatus 128 is deployed in a swimming pool for the purpose of enabling generation of a measurement related to one or more data points associated with a swimmer's stroke.

Figure 1E:
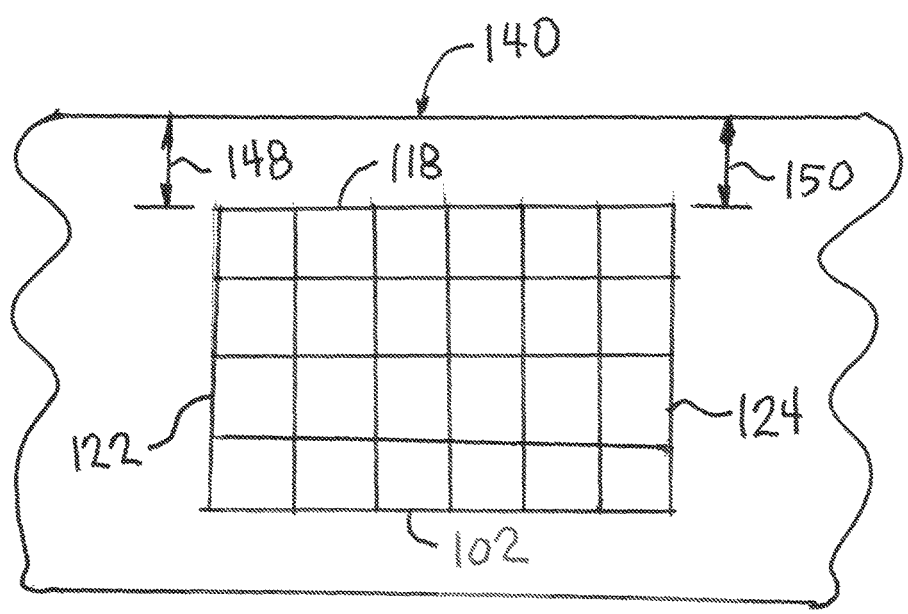

FIG. 1(e) shows an illustration of a front view the measurement panel 102 (shown in FIG. 1(a)) positioned in a swimming pool having a surface 140 and positioned at least partially below the surface 140 of the water and substantially parallel to the surface 140 of the water. The measurement panel 102 is substantially parallel to the surface 140 of the water when a first distance 148 between the surface 140 and the top horizontal edge 118 near the first vertical edge 122 is substantially equal to a second distance 150 between the surface 140 and the top horizontal edge 118 near the second vertical edge 124.

Figure 1F:
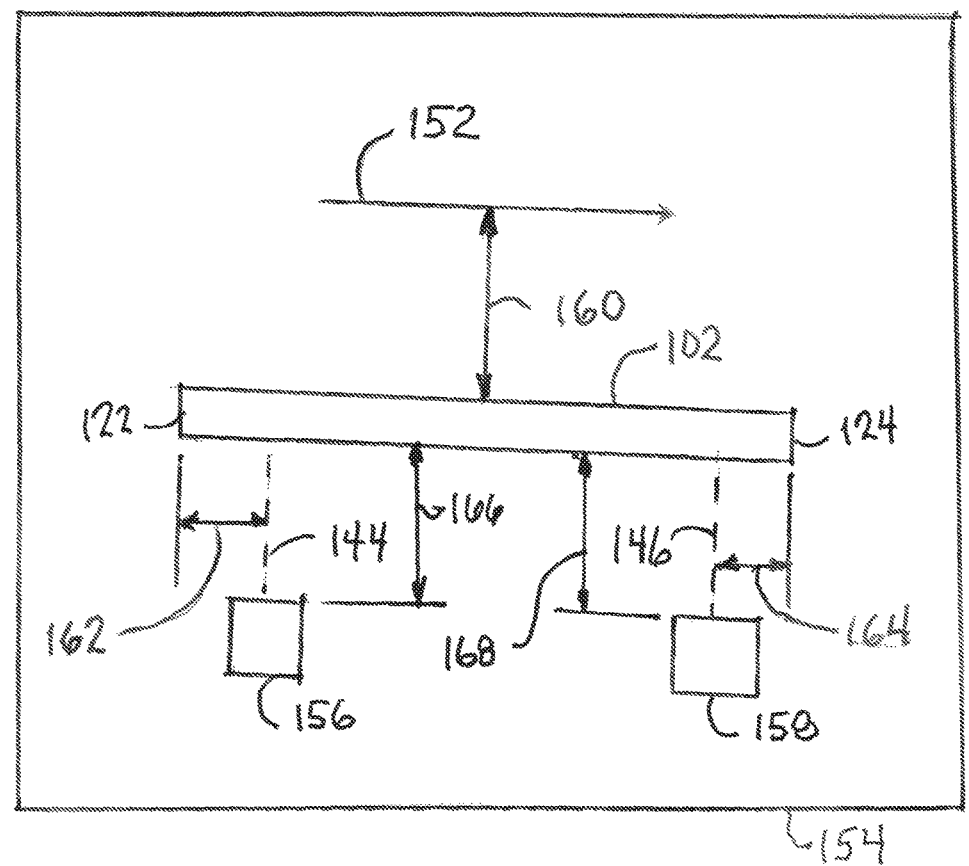

FIG. 1(f) shows an illustration of a top view of a swimmer's path 152 in a swimming pool 154 in relation to the measurement panel 102 (shown in FIG. 1(a)) and a first camera 156 optically aligned substantially perpendicular to the measurement panel 102 and a second camera 158 optically aligned substantially perpendicular to the measurement panel 102 in accordance with some embodiments of the present disclosure. The first camera 156 is optically aligned substantially perpendicular to the measurement panel 102 along a first camera optical path 144. The second camera 158 is optically aligned substantially perpendicular to the measurement panel 102 along a second camera optical path 146. The first camera optical path 144 is defined as the shortest path from the camera optics to the measurement panel 102. The second camera optical path 146 is defined as the shortest path from the camera optics to the measurement panel 102. The swimmer's path 152 is located at a swimmer distance 160 of between about two and about six feet from the measurement panel 102 and runs substantially parallel to the measurement panel 102. In some embodiments, the swimmer's path 152 is located at the swimmer distance 160 of about three feet from the measurement panel 102.

In operation, the first camera 156 is located underwater and at a first camera distance 162 of between about one and about three feet from the first vertical edge 122. In some embodiments, the first camera distance 162 is about two feet. In addition, the first camera 156 is located at a first camera-to-measurement screen distance 166. In some embodiments, the first camera-to-measurement panel distance 166 is between about ten feet and about fifteen feet. In operation, the second camera 158 is located underwater and at a second camera distance 164 of between about one and about three feet from the second vertical edge 124. In some embodiments, the second camera distance 164 is about two feet. In addition, the second camera 158 is located at a second camera-to-measurement panel distance 168. In some embodiments, the second camera-to-measurement panel distance 168 is between about ten feet and about fifteen feet. In some embodiments, the first camera-to-measurement panel distance 166 is substantially equal to the second camera-to-measurement panel distance 168. Those skilled in the art will appreciate that although an embodiment with two cameras is used to illustrate operation of the subject matter of the present disclosure other embodiments utilizing a single camera or more than two cameras are also suitable for use in connection with the subject matter of the present disclosure.

The first camera 156 and the second camera 155 are image recording devices capable of storing images locally, remotely, or both. The first camera 156 and the second camera 158 are not limited to a particular type of camera. Any camera capable of recording an image of a swimmer underwater viewed through the measurement grid 110 is suitable for use in connection with recording a swimmer in accordance with the embodiments of the present disclosure. Exemplary image recording devices suitable for use in connection with recording a swimmer's stroke as viewed through the measurement grid 110 underwater include video cameras, movie cameras, camcorders, and still cameras.

Figure 2:
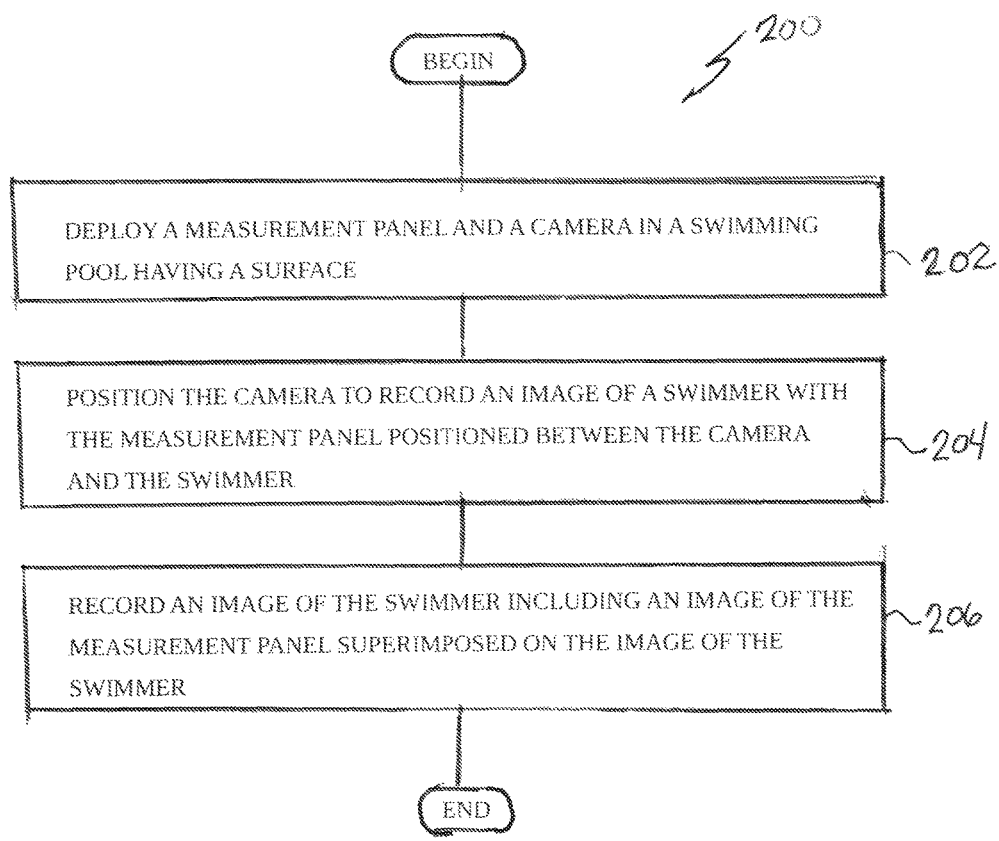
FIG. 2 shows a flow diagram of a method for recording an image of a swimmer in accordance with some embodiments of the present disclosure.

FIG. 2 shows a flow diagram of a method 200 for recording an image of a swimmer in accordance with some embodiments of the present disclosure. The method 200 includes deploying a measurement panel and a camera in a swimming pool having a surface (block 202), positioning the camera to record an image of a swimmer with the measurement panel positioned between the camera and the swimmer (block 204), and recording an image of the swimmer including an image of the measurement panel superimposed on the image of the swimmer (block 206). In some embodiments, deploying the measurement panel and the camera in the swimming pool includes aligning an edge of the measurement panel substantially parallel to the surface of the swimming pool. In some embodiments, positioning the camera to record the image of the swimmer with the measurement panel positioned between the camera and the swimmer includes positioning the camera to record a head on image of the swimmer. In some embodiments, positioning the camera to record the image of the swimmer with the measurement panel positioned between the camera and the swimmer includes positioning the camera to record a side image of the swimmer.

Figure 3:
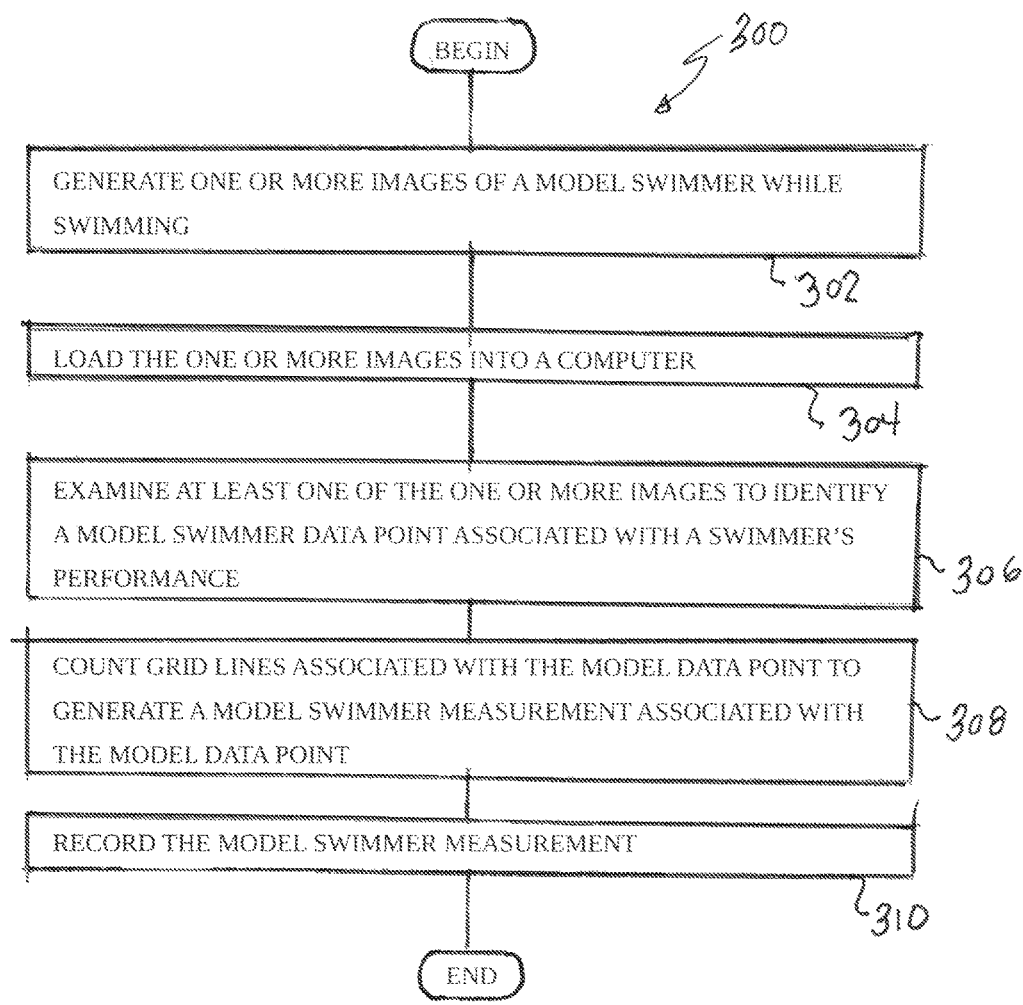
FIG. 3 shows a flow diagram of a method for generating a measurement associated with a model swimmer in accordance with some embodiments of the present disclosure.

FIG. 3 shows a flow diagram of a method 300 for generating a measurement associated with a model swimmer in accordance with some embodiments of the present disclosure. The method 300 includes generating one or more images of a model swimmer while swimming (block 302), loading the one or more images into a computer (block 304), examining at least one of the one or more images to identify a model swimmer data point associated with a swimmer's performance (block 306), counting grid lines associated with the model data point to generate a model swimmer measurement associated with the model data point (block 308), and recording the model swimmer measurement (block 310). In some embodiments, generating the one or more images of the model swimmer while swimming includes generating the one or more images of an Olympic swimmer while swimming.

Figure 4:
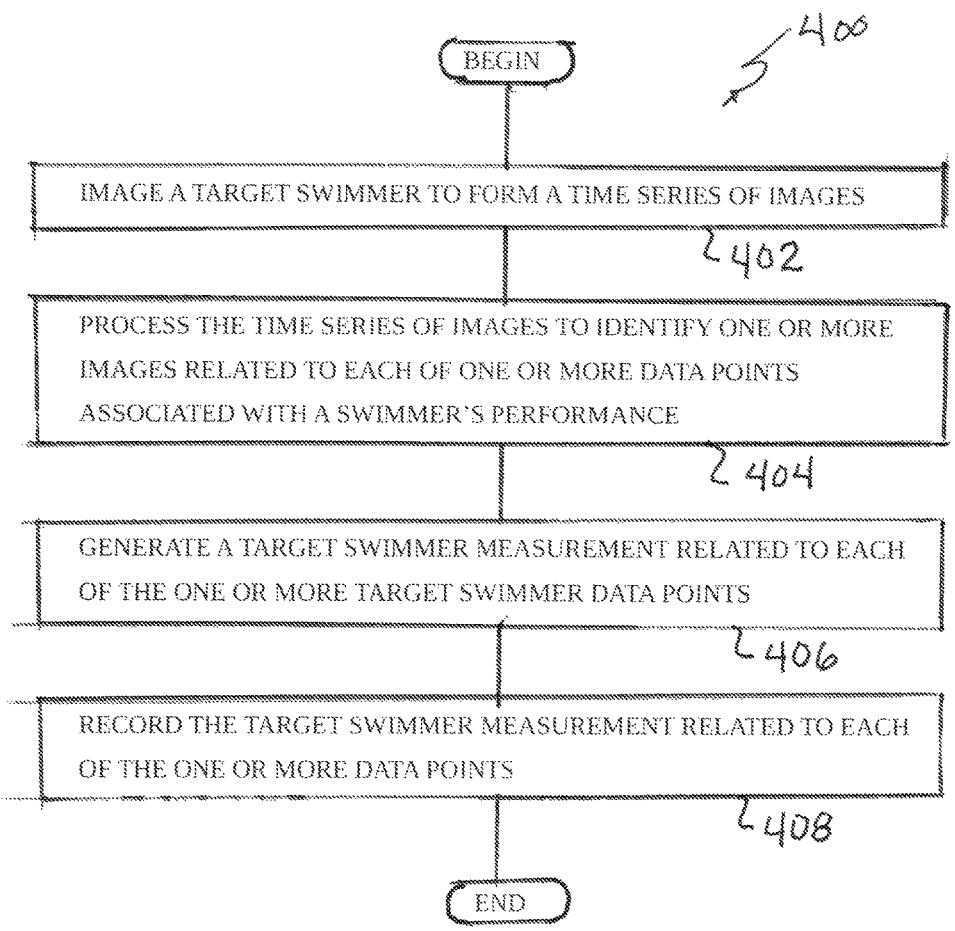
FIG. 4 shows a flow diagram for a method for generating data points related to a target swimmer's performance in accordance with some embodiments of the present disclosure.

FIG. 4 shows a flow diagram for a method 400 for generating data points related to a target swimmer's performance in accordance with some embodiments of the present disclosure. The method 400 includes imaging a target swimmer to form a time series of images (block 402), processing the time series of images to identify one or more images related to each of one or more data points associated with a swimmer's performance (404), generating a target swimmer measurement related to each of the one or more target swimmer data points (block 406), and recording the target swimmer measurement related to each of the one or more data points (block 408). In some embodiments, imaging the target swimmer to form the time series of images includes recording video images of the target swimmer's performance. In some embodiments, processing the time series of images to identify the one or more images related to each of the one or more data points associated with the target swimmer's performance includes viewing the time series of images by enlarging the time series of images on a viewing screen. Enlarging or zooming in on the tie series of images enables the analyst to identify differences in mechanical motions on the order of centimeters.

Figure 5:
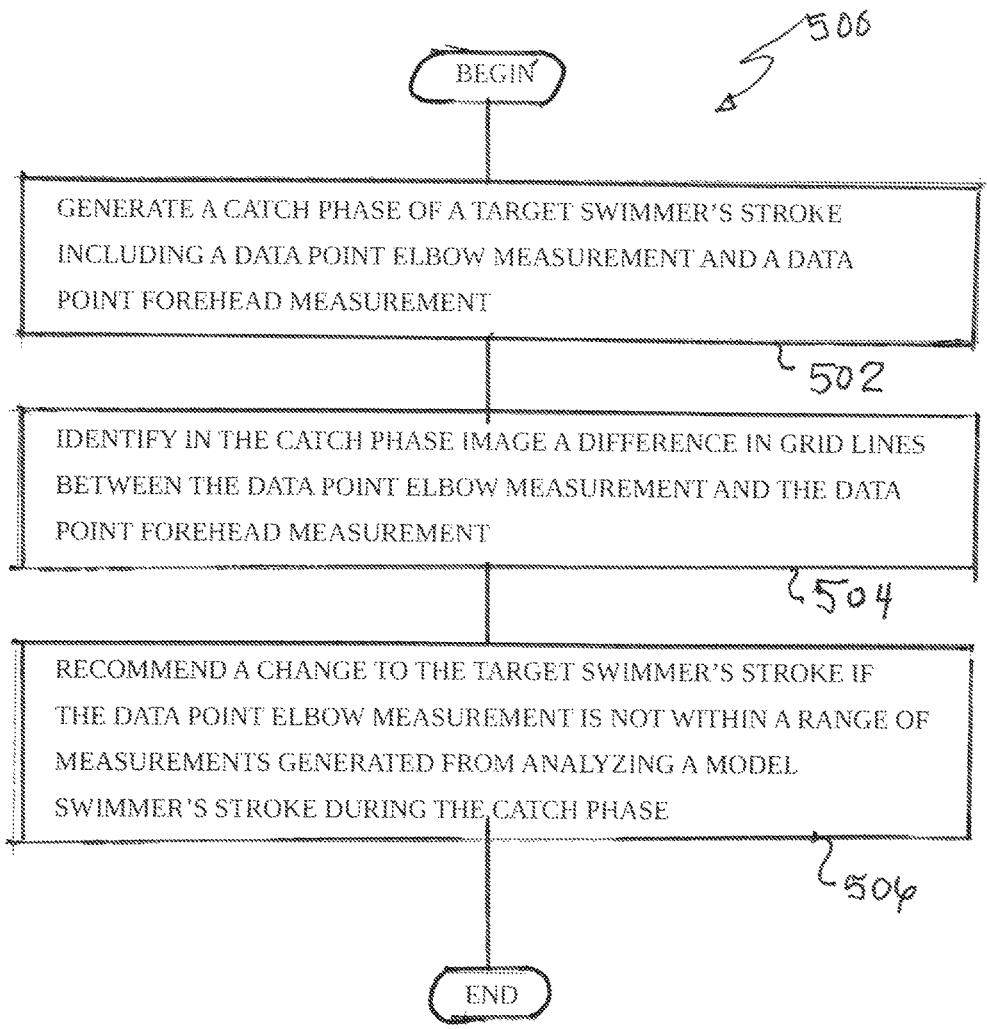
FIG. 5 shows a flow diagram of a method for generating recommendations for changing a target swimmer's performance in accordance with some embodiments of the present disclosure.

FIG. 5 shows a flow diagram of a method 500 for generating recommendations for changing a target swimmer's performance in accordance with some embodiments of the present disclosure. The method 500 includes generating a catch phase image of a target swimmer's stroke including a data point elbow measurement and a data point forehead measurement (block 502), identifying in the catch phase image a difference in grid lines between the data point elbow measurement and the data point forehead measurement (block 504), and recommending a change to the target swimmer's stroke if the data point elbow measurement is not within a range of measurements generated from analyzing a model swimmer's stroke during the catch phase (block 506). In some embodiments, the method 500 further includes imaging the target swimmer after recommending the change.

Figure 6:
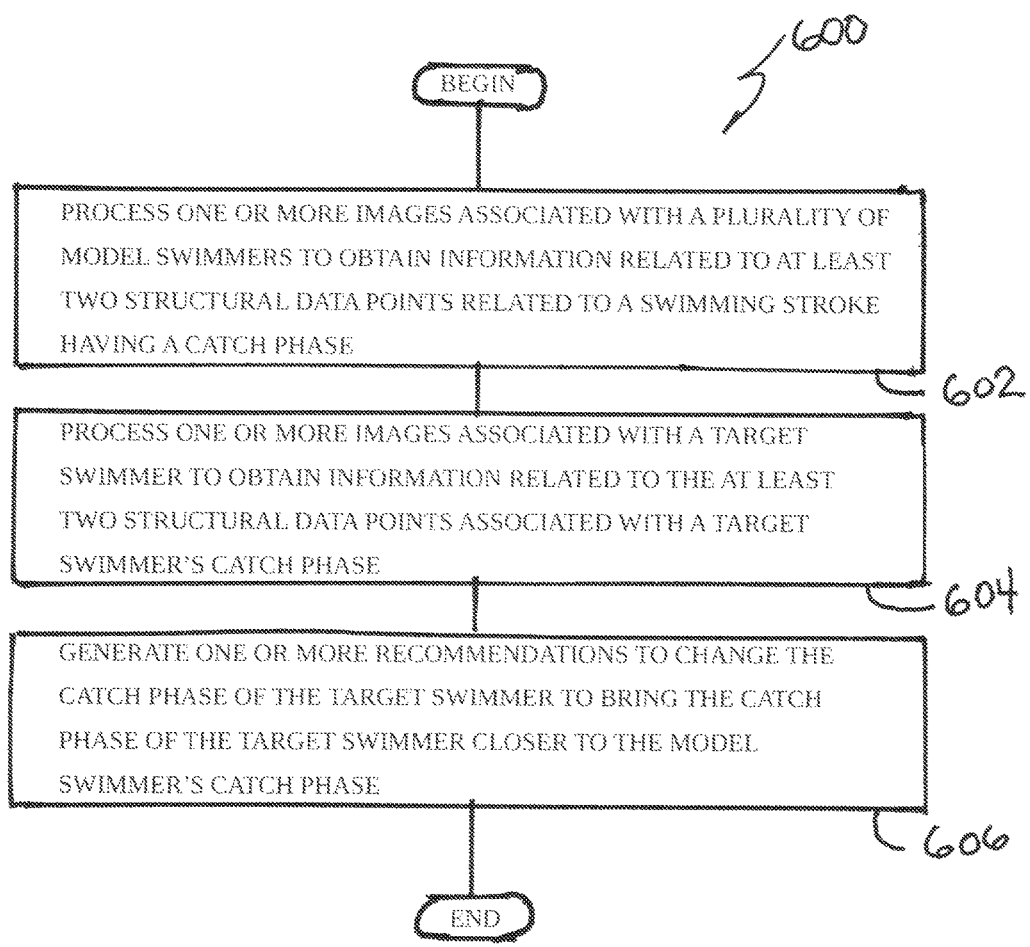
FIG. 6 shows a flow diagram of a method for generating recommendations for changing the catch phase of a target swimmer's stroke in accordance with some embodiments of the present disclosure.

FIG. 6 shows a flow diagram of a method 600 for generating recommendations for changing the catch phase of a target swimmer's stroke in accordance with some embodiments of the present disclosure. The method 600 includes processing one or more images associated with a plurality of model swimmers to obtain information related to at least two structural data points related to a swimming stroke having a catch phase (block 602), processing one or more images associated with a target swimmer to obtain information related to the at least two structural data points associated with a target swimmer's catch phase (block 604), and generating one or more recommendations to change the catch phase of the target swimmer to bring the catch phase of the target swimmer closer to the model swimmer's catch phase (block 606). In some embodiments, processing the one or more images associated with the target swimmer to obtain information related to the at least two structural data points associated with the target swimmer's catch phase includes measuring grid lines between the two structural data points.

Figure 7:
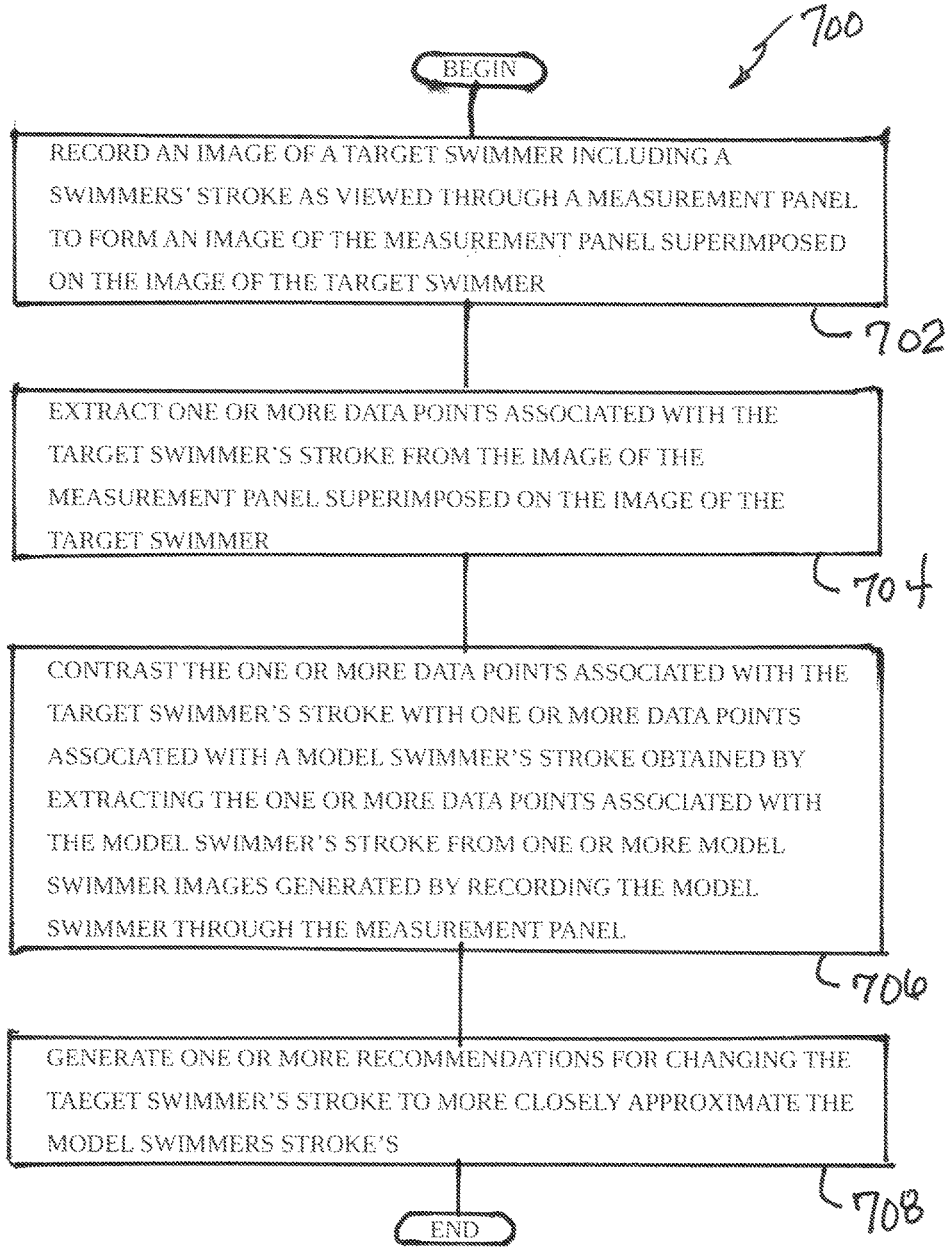
FIG. 7 shows a flow diagram of a method for generating a recommendation for changing a target swimmer's stroke after contrasting the target swimmer's stroke with a model swimmer's stroke in accordance with some embodiments of the present disclosure.

FIG. 7 shows a How diagram of a method 700 for generating a recommendation for changing a target swimmer's stroke after contrasting the target swimmer's stroke with a model swimmer's stroke in accordance with some embodiments of the present disclosure. The method 700 includes recording an image of a target swimmer including a swimmer's stroke as viewed through a measurement panel to form an image of the measurement panel superimposed on the image of the target swimmer (block 702), extracting one or more data points associated with the target swimmer's stroke from the image of the measurement panel superimposed on the image of the target swimmer (block 704), contrasting the one or more data points associated with the target swimmer's stroke with one or more data points associated with a model swimmer's stroke obtained by extracting the one or more data points associated with a model swimmer's stroke from one or more model swimmer images generated by recording the model swimmer through the measurement panel (block 706), and generating one or more recommendations for changing the target swimmer's stroke to more closely approximate the model swimmer's stroke (bock 708). In some embodiments, recording the image of the target swimmer including the swimmer's stroke as viewed through the measurement panel to form the image of the measurement panel superimposed on the image of the target swimmer includes recording the image of the target swimmer including the target swimmer's stroke to give a side view of the target swimmer. In some embodiments, recording the image of the target swimmer including the swimmer's stroke as viewed through the measurement panel to form the image of the measurement panel superimposed on the image of the target swimmer includes recording the image of the target swimmer including the target swimmer's stroke to give a front view of the target swimmer.

Four exemplary data points or phases of a freestyle swimmer's stroke that can be analyzed from a head-on underwater perspective using the method and apparatus of the present disclosure include the extension phase, catch phase, diagonal phase, and finish phase. First, to analyze a target swimmer and a model swimmer during the extension phase of the swimmer's stroke, a coach creates a time sequence of images of each swimmer viewed head-on through the measurement panel 102 (shown in FIG. 1(*a*)), selects an image that represents the extensions phase for each swimmer, and extracts measurement data for each swimmer's hand, elbow, and shoulder. Measurement data for the hand, elbow and shoulder of each swimmer is extracted from the extension phase images by measuring the distance between the hand, elbow, and shoulder from a reference point, such as the swimmer's forehead. The measurement data is resolved into a vertical (depth) and a lateral measurement in terms of grid line changes for the hand, elbow, and shoulder of each swimmer. The vertical and lateral measurements for the hand, elbow, and shoulder of the target swimmer are contrasted with the vertical and lateral measurements for the hand, elbow, and shoulder of the model swimmer. Recommendations for changes to the target swimmer's stroke are formulated and provided to the target swimmer to assist the target swimmer in modifying her stroke to more closely resemble the model swimmer's stroke. Follow-up measurements of the target swimmer may be used to evaluate the effectiveness of the recommendations.

Second, to analyze a target swimmer and a model swimmer during the catch phase of the swimmer's stroke, a coach creates a time sequence of images of each swimmer viewed head-on through the measurement panel 102 (shown in FIG. 1(*a*)), selects images that represents the catch phase and the extension phase, and extracts measurement data for each swimmer's hand, elbow, and shoulder. Measurement data for the hand, elbow and shoulder of each swimmer is extracted from the catch phase images and the extension phase images by measuring the distance between the hand, elbow, and shoulder in the catch phase images and the hand, elbow, and shoulder, respectively, in the extension phase images. The measurement data is resolved into a vertical (depth) and a lateral measurement in terms of grid line changes between the hand, elbow, and shoulder of the catch phase and the hand, elbow, and shoulder of the extension phase of each swimmer. The vertical and lateral measurements for the hand, elbow, and shoulder of the target swimmer are contrasted with the vertical and lateral measurements for the hand, elbow, and shoulder of the model swimmer. Recommendations for changes to the target swimmer's stroke are formulated and provided to the target swimmer to assist the target swimmer in modifying her stroke to more closely resemble the model swimmer's stroke. Follow-up measurements of the target swimmer may be used to evaluate the effectiveness of the recommendations.

Third, to analyze a target swimmer and a model swimmer during the diagonal phase of the swimmer's stroke, a coach creates a time sequence of images of each swimmer viewed head-on through the measurement panel 102 (shown in FIG. 1(*a*)), selects images that represents the diagonal phase and the catch phase, and extracts measurement data for each swimmer's hand, elbow, and shoulder. Measurement data for the hand, elbow and shoulder of each swimmer is extracted from the diagonal phase images and the catch phase images by measuring the distance between the hand, elbow, and shoulder in the diagonal phase images and the hand, elbow, and shoulder, respectively, in the catch phase images. The measurement data is resolved into a vertical (depth) and a lateral measurement in terms of grid line changes between the hand, elbow, and shoulder of the diagonal phase images and the hand, elbow, and shoulder of the catch phase images of each swimmer. The vertical and lateral measurements for the hand, elbow, and shoulder of the target swimmer are contrasted with the vertical and lateral measurements for the hand, elbow, and shoulder of the model swimmer. Recommendations for changes to the target swimmer's stroke are formulated and provided to the target swimmer to assist the target swimmer in modifying her stroke to more closely resemble the model swimmer's stroke. Follow-up measurements of the target swimmer may be used to evaluate the effectiveness of the recommendations.

Fourth, to analyze a target swimmer and a model swimmer during the finish phase of the swimmer's stroke, a coach creates a time sequence of images of each swimmer viewed head-on through the measurement panel 102 (shown in FIG. 1(*a*)), selects images that represent the finish phase and the diagonal phase, and extracts measurement data for each swimmer's hand, elbow, and shoulder. Measurement data for the hand, elbow and shoulder of each swimmer is extracted from the finish phase images and the diagonal phase images by measuring the distance between the hand, elbow, and shoulder in the finish phase images and the hand, elbow, and shoulder, respectively, in the diagonal phase images. The measurement data is resolved into a vertical (depth) and a lateral measurement in terms of grid line changes between the hand, elbow, and shoulder of the finish phase images and the hand, elbow, and shoulder of the diagonal phase images of each swimmer. The vertical and lateral measurements for the hand, elbow, and shoulder of the target swimmer are contrasted with the vertical and lateral measurements for the hand, elbow, and shoulder of the model swimmer. Recommendations for changes to the target swimmer's stroke are formulated and provided to the target swimmer to assist the target swimmer in modifying her stroke to more closely resemble the model swimmer's stroke. Follow-up measurements of the target swimmer may be used to evaluate the effectiveness of the recommendations.

Four exemplary data points or phases of a freestyle swimmer's stroke that can be analyzed from a profile underwater perspective using the method and apparatus of the present disclosure include the extension phase, catch phase, diagonal phase, and finish phase. First, to analyze a target swimmer and a model swimmer during the extension phase of the swimmer's stroke, a coach creates a time sequence of images of each swimmer viewed from the side through the measurement panel 102 (shown in FIG. 1(*a*)), selects an image that represents the extensions phase for each swimmer, and extracts measurement data for each swimmer's forehead, hand, elbow, and shoulder. Measurement data for the forehead, hand, elbow and shoulder of each swimmer is extracted from the extension phase images by measuring the distance between the hand, elbow, and shoulder from a reference point, such as the swimmer's forehead. The measurement data is resolved into a vertical (depth) and a fore-aft measurement in terms of grid line changes for the hand, elbow, and shoulder of each swimmer. The vertical and fore-aft measurements for the hand, elbow, and shoulder of the target swimmer are contrasted with the vertical and fore-aft measurements for the hand, elbow, and shoulder of the model swimmer. Recommendations for changes to the target swimmer's stroke are formulated and provided to the target swimmer to assist the target swimmer in modifying her stroke to more closely resemble the model swimmer's stroke. Follow-up measurements of the target swimmer may be used to evaluate the effectiveness of the recommendations.

Second, to analyze a target swimmer and a model swimmer during the catch phase of the swimmer's stroke, a coach creates a time sequence of images of each swimmer viewed from the side through the measurement panel 102 (shown in FIG. 1(*a*)), selects images that represent the catch phase and the extension phase, and extracts measurement data for each swimmer's forehead, hand, elbow, and shoulder. In the catch phase images, measurement data for the forehead, hand, elbow and shoulder of each swimmer is extracted from the catch phase images by measuring the distance between the hand, elbow, and shoulder and a reference point, such as the swimmer's forehead, to form preliminary catch phase measurement data. Measurement data for the hand, elbow and shoulder of each swimmer is extracted from the catch phase images in combination with the extension phase images by measuring the distance between the preliminary catch phase measurement data for the hand, elbow, and shoulder and the extension phase measurement data for the hand, elbow, and shoulder, respectively. The measurement data is resolved into a vertical (depth) and a fore-aft measurement in terms of grid line changes between the hand, elbow, and shoulder of the catch phase and the hand, elbow, and shoulder of the extension phase of each swimmer. The vertical and fore-aft measurements for the hand, elbow, and shoulder of the target swimmer are contrasted with the vertical and fore-aft measurements for the hand, elbow, and shoulder of the model swimmer. Recommendations for changes to the target swimmer's stroke are formulated and provided to the target swimmer to assist the target swimmer in modifying her stroke to more closely resemble the model swimmer's stroke. Follow-up measurements of the target swimmer may be used to evaluate the effectiveness of the recommendations.

Third, to analyze a target swimmer and a model swimmer during the diagonal phase of the swimmer's stroke, a coach creates a time sequence of images of each swimmer viewed from the side through the measurement panel 102 (shown in FIG. 1(*a*)), selects images that represent the diagonal phase and the catch phase, and extracts measurement data for each swimmer's forehead, hand, elbow, and shoulder. In the diagonal phase images, measurement data for the forehead, hand, elbow and shoulder of each swimmer is extracted from the diagonal phase images by measuring the distance between the hand, elbow, and shoulder and a reference point, such as the swimmer's forehead, to form preliminary diagonal phase measurement data. Measurement data for the hand, elbow and shoulder of each swimmer is extracted from the diagonal phase images in combination with the catch phase images by measuring the distance between the preliminary diagonal phase measurement data for the hand, elbow, and shoulder and the catch phase measurement data for the hand, elbow, and shoulder, respectively. The measurement data is resolved into a vertical (depth) and a fore-aft measurement in terms of grid line changes between the hand, elbow, and shoulder of the diagonal phase and the hand, elbow, and shoulder of the catch phase of each swimmer. The vertical and fore-aft measurements for the hand, elbow, and shoulder of the target swimmer are contrasted with the vertical and fore-aft measurements for the hand, elbow, and shoulder of the model swimmer. Recommendations for changes to the target swimmer's stroke are formulated and provided to the target swimmer to assist the target swimmer in modifying her stroke to more closely resemble the model swimmer's stroke. Follow-up measurements of the target swimmer may be used to evaluate the effectiveness of the recommendations.

Fourth, to analyze a target swimmer and a model swimmer during the finish phase of the swimmer's stroke, a coach creates a time sequence of images of each swimmer viewed from the side through the measurement panel 102 (shown in FIG. 1(*a*)), selects images that represent the finish phase and the diagonal phase, and extracts measurement data for each swimmer's forehead, hand, elbow, and shoulder. In the finish phase images, measurement data for the forehead, hand, elbow and shoulder of each swimmer is extracted from the finish phase images by measuring the distance between the hand, elbow, and shoulder and a reference point, such as the swimmer's forehead, to form preliminary finish phase measurement data. Measurement data for the hand, elbow and shoulder of each swimmer is extracted from the finish phase images in combination with the diagonal phase images by measuring the distance between the preliminary finish phase measurement data for the hand, elbow, and shoulder and the diagonal phase measurement data for the hand, elbow, and shoulder, respectively. The measurement data is resolved into a vertical (depth) and a fore-aft measurement in terms of grid line changes between the hand, elbow, and shoulder of the finish phase and the hand, elbow, and shoulder of the diagonal phase of each swimmer. The vertical and fore-aft measurements for the hand, elbow, and shoulder of the target swimmer are contrasted with the vertical and fore-aft measurements for the hand, elbow, and shoulder of the model swimmer. Recommendations for changes to the target swimmer's stroke are formulated and provided to the target swimmer to assist the target swimmer in modifying her stroke to more closely resemble the model swimmer's stroke. Follow-up measurements of the target swimmer may be used to evaluate the effectiveness of the recommendations.

Those skilled in the art will appreciate that the four stroke phases—extension, catch, diagonal, and finish—are present in each of the four strokes (butterfly, backstroke, breaststroke, and freestyle), with the exception of the finish phase, which is not present in the breaststroke. Thus, the teachings of the present disclosure are applicable to analyzing each of the four strokes. In addition, each of the phases may be defined as occurring in a particular time interval of the stroke cycle. For example, for a swimmer moving at a moderate up-tempo velocity the four phases are completed in about one second. Hence, the extension phase at this velocity occurs in the time interval of between about 0 seconds to about 0.25 seconds, the catch phase occurs in the time interval of between about 0.25 seconds and about 0.50 seconds, the diagonal phase occurs in the time interval of between about 0.50 seconds and about 0.75 seconds, and the finish phase occurs in the time interval of between about 0.75 seconds and about 1.00 seconds. To analyze the stroke of a swimmer moving at a higher or lower velocity, the intervals are scaled appropriately.

Figure 8:
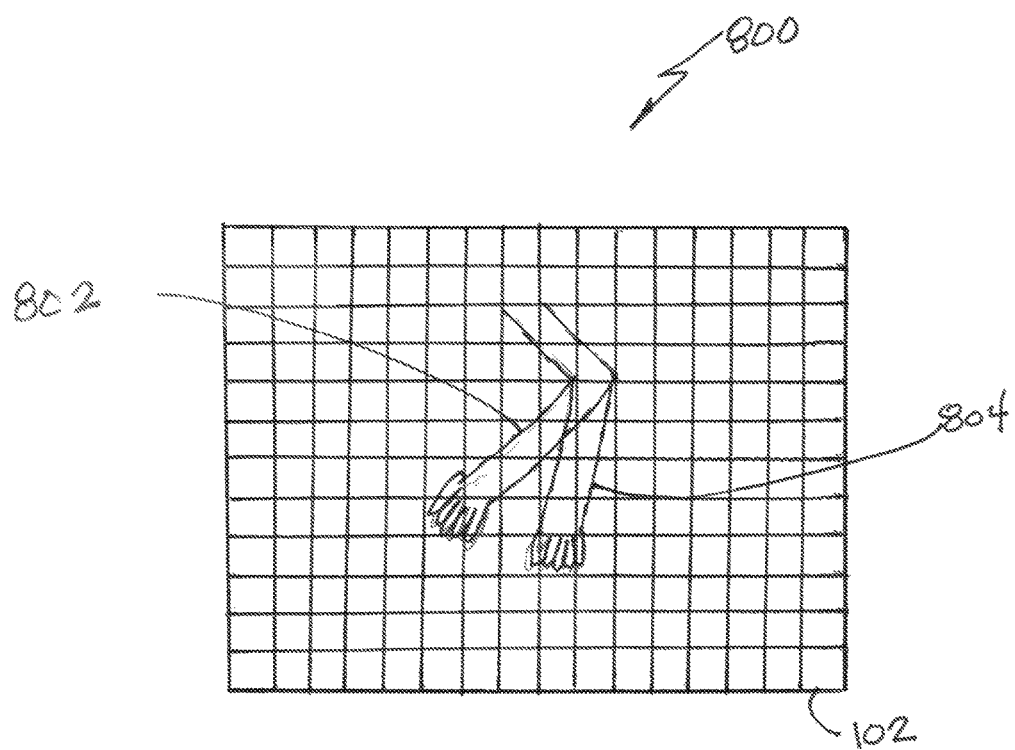
FIG. 8 shows an illustration of superimposed images including an image of the measurement grid and a head-on view of a model swimmer's arm and a target swimmer's arm at the diagonal phase of each swimmer's stroke in accordance with some embodiments of the present disclosure.

FIG. 8 shows an illustration of superimposed images 800 including an image of the measurement grid 102 and a head-on view of a model swimmer's arm 802 and a target swimmer's arm 804 at the diagonal phase of each swimmer's stroke in accordance with some embodiments of the present disclosure. The arm position for each swimmer at the preceding catch phase were substantially identical. Analysis of these superimposed images shows that the lateral distance from the tip of the model swimmer's elbow to the center of the model swimmer's hand is about four grid lines. However, analysis of the target swimmer's stroke shows that the lateral distance from the tip of the target swimmer's elbow to the center of the target swimmer's hand is about two grid lines. Thus, the corrective recommendation to the target swimmer is to increase the lateral sweep during the diagonal phase of her stroke. Similar data collection and analysis can be done at any time during a stroke cycle from either a head on view or a side view of a target swimmer and a model swimmer using embodiments of the apparatus and methods of the present disclosure.

Reference throughout this specification to "an embodiment," "some embodiments," or "one embodiment." means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure. Furthermore, the particular features, structures, materials, or characteristics may be combined in any suitable manner in one or more embodiments.

Although explanatory embodiments have been shown and described, it would be appreciated by those skilled in the art that the above embodiments cannot be construed to limit the present disclosure, and changes, alternatives, and as can be made in the embodiments without departing from spirit, principles and scope of the present disclosure.

What is claimed is:

1. A method comprising:
    recording an image of a target swimmer including a swimmer's stroke as viewed through a measurement panel to form an image of the measurement panel superimposed on the image of the target swimmer;
    extracting one or more data points associated with the target swimmer's stroke from the image of the measurement panel superimposed on the image of the target swimmer;
    contrasting the one or more data points associated with the target swimmer's stroke with one or more data points associated with a model swimmer's stroke obtained by extracting the one or more data points associated with a model swimmer's stroke from one or more model swimmer images generated by recording the model swimmer through the measurement panel; and
    generating one or more recommendations for changing the target swimmer's stroke to more closely approximate the model swimmer's stroke.

2. The method of claim 1, wherein the recording the image of the target swimmer including the swimmer's stroke as viewed through the measurement panel to form the image of the measurement panel superimposed on the image of the target swimmer comprises:
    recording the image of the target swimmer including the target swimmer's stroke to give a side view of the target swimmer.

3. The method of claim 2 wherein the recording the image of the target swimmer including the swimmer's stroke as viewed through the measurement panel to form the image of the measurement panel superimposed on the image of the target swimmer comprises:
    recording the image of the target swimmer including the target swimmer's stroke to give a front view of the target swimmer.

\* \* \* \* \*